(12) United States Patent
Grancharov et al.

(10) Patent No.: US 10,916,254 B2
(45) Date of Patent: Feb. 9, 2021

(54) SYSTEMS, APPARATUSES, AND METHODS FOR SPEAKER VERIFICATION USING ARTIFICIAL NEURAL NETWORKS

(71) Applicant: Telefonaktiebolaget LM Ericsson (publ), Stockholm (SE)

(72) Inventors: Volodya Grancharov, Solna (SE); Stefano Imoscopi, Trento (IT); Sigurdur Sverrisson, Kungsängen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 167 days.

(21) Appl. No.: 16/327,147

(22) PCT Filed: Aug. 22, 2016

(86) PCT No.: PCT/EP2016/069832
§ 371 (c)(1),
(2) Date: Feb. 21, 2019

(87) PCT Pub. No.: WO2018/036610
PCT Pub. Date: Mar. 1, 2018

(65) Prior Publication Data
US 2019/0206410 A1    Jul. 4, 2019

(51) Int. Cl.
*G10L 17/18* (2013.01)
*G10L 17/04* (2013.01)
*G06N 3/04* (2006.01)

(52) U.S. Cl.
CPC ............ *G10L 17/18* (2013.01); *G06N 3/0454* (2013.01); *G06N 3/0472* (2013.01); *G10L 17/04* (2013.01)

(58) Field of Classification Search
None
See application file for complete search history.

(56) References Cited

U.S. PATENT DOCUMENTS

| 9,042,867 B2 * | 5/2015 | Gomar | G10L 17/00 |
| | | | 455/411 |
| 2006/0111905 A1 * | 5/2006 | Navratil | G10L 15/144 |
| | | | 704/256.7 |

(Continued)

OTHER PUBLICATIONS

Buera et al., (L. Buera, a. Miguel, Ó Saz, A. Ortega and E. Lleida, "Unsupervised Data-Driven Feature Vector Normalization With Acoustic Model Adaptation for Robust Speech Recognition," in IEEE Transactions on Audio, Speech, and Language Processing, vol. 18, No. 2, pp. 296-309, Feb. 2010) (Year: 2010).*

(Continued)

*Primary Examiner* — Edgar X Guerra-Erazo
(74) *Attorney, Agent, or Firm* — Murphy, Bilak & Homiller, PLLC

(57) ABSTRACT

In one aspect, instead of discriminative training a single K-class ANN, a proposed architecture discriminative trains K ANNs (e.g., the following K 2-class ANNs are trained: ANN_1, ANN_2, ANN_K). Each one of these K 2-class ANNs learns to discriminate between audio material from one of the enrolled speakers and "average" speech material (e.g., a feature vector generated using a Gaussian Mixture Model trained Universal Background Model (GMM-UBM)). That is, for example, ANN_i is trained to discriminate between audio material from the $i^{th}$ enrolled speaker and the "average" speech material. In the event that a new enrolled speaker is to be added to the system, an additional ANN is trained (e.g., ANN_(K+1)) with the available audio material (audio features) from that particular speaker and audio features produced from the GMM-UBM system.

6 Claims, 10 Drawing Sheets

(56) References Cited

U.S. PATENT DOCUMENTS

| | | | | |
|---|---|---|---|---|
| 2008/0249774 | A1* | 10/2008 | Kim | G10L 17/02 704/250 |
| 2011/0202340 | A1* | 8/2011 | Ariyaeeinia | G10L 17/12 704/233 |
| 2011/0282661 | A1* | 11/2011 | Dobry | G10L 17/02 704/231 |
| 2014/0016835 | A1* | 1/2014 | Song | G06K 9/00892 382/118 |
| 2014/0200890 | A1* | 7/2014 | Kurniawati | G10L 15/06 704/236 |
| 2015/0112684 | A1 | 4/2015 | Scheffer et al. | |
| 2015/0127336 | A1* | 5/2015 | Lei | G10L 17/18 704/232 |
| 2017/0294191 | A1* | 10/2017 | Shi | G10L 15/20 |
| 2019/0080697 | A1* | 3/2019 | Grancharov | G10L 17/20 |

OTHER PUBLICATIONS

Y. Liu, T. Fu, Y. Fan, Y. Qian and K. Yu, "Speaker verification with deep features," 2014 International Joint Conference on Neural Networks (IJCNN), Beijing, 2014, pp. 747-753, doi: 10.1109/IJCNN.2014.6889708. (Year: 2014).*

Reynolds, Douglas A., et al., "Speaker Verification Using Adapted Gaussian Mixture Models", Digital Signal Processing, vol. 10, No. 1-3, Jan. 2000, 19-41.

Xiang, Bing, et al., "Efficient Text-Independent Speaker Verification with Structural Gaussian Mixture Models and Neural Network", IEEE Transactions on Speech and Audio Processing, vol. 11, No. 5, Sep. 2003, 447-456.

* cited by examiner

SYSTEMS, APPARATUSES, AND METHODS FOR SPEAKER VERIFICATION USING ARTIFICIAL NEURAL NETWORKS

TECHNICAL FIELD

Aspects of this disclosure relate to systems and methods for speaker verification using artificial neural network (ANNs).

BACKGROUND

Speaker verification systems are designed to determine whether an unknown speaker is the person that the unknown speaker claims to be based on an utterance from the unknown speaker (e.g., determining whether an unknown voice is from a particular enrolled speaker).

In a typical ANN based speaker verification system, there is a group of K enrolled speakers and a single ANN is discriminative trained using utterances from each of the K enrolled speakers. This is illustrated in FIG. 1, which shows an ANN 100 receiving K feature vectors (i.e., feature vectors x1, x2, . . . , xK). Each one of the K feature vectors is an n-dimensional vector (n greater than or equal to 1) created using an utterance made from one of the enrolled speakers (i.e., a feature vector can consist of a set of vectors). For example, feature vector xi is a feature vector created from one or more utterances made by the $i^{th}$ enrolled speaker. Each of the feature vectors x1 to xK can consist of Mel-Frequency Cepstral Coefficients (MFCCs) extracted from a short utterance.

Once the ANN is trained, the ANN can be used to determine whether an unknown speaker (U) is one of the K enrolled speaker. This is accomplished by creating a feature vector (xU) using an utterance from the unknown speaker and inputting xU into the ANN, which then produces a posterior probability for each of the K enrolled speakers—i.e., posterior probabilities pp1, pp2, . . . , ppK are generated, wherein each posterior probability indicates a probability that the unknown speaker is the enrolled speaker associated with the posterior probability. Thus, if ppj=Max (pp1, pp2, . . . , ppK) and ppj>T (T being a predefined threshold value), then the system will determine that the unknown speaker is the $j^{th}$ enrolled speaker.

SUMMARY

It is desirable that, as time goes on, an ANN based speaker verification system be extended with new enrolled speakers (for example L additional speakers). For the conventional ANN architecture, however, this requires a complete retraining of the ANN on the entire group of (K+L) enrolled speakers. This is a serious drawback for at least the following two reasons: 1) it requires total the amount of training audio material to be stored, which might be impossible due to a legal constraints or hardware limitations, and 2) training time progressively increases as the number of enrolled speakers increases.

This disclosure describes an improved ANN speaker verification system that is easily extendible as new speakers are enrolled in the system.

In one aspect, instead of discriminative training a single K-class ANN, the proposed architecture discriminative trains K ANNs (e.g., the following 2-class ANNs are trained: ANN_1, ANN_2, . . . , ANN_K). Each one of these K 2-class ANNs learns to discriminate between audio material from one of the enrolled speakers and "average" speech material (e.g., a feature vector generated using a Gaussian Mixture Model trained Universal Background Model (GMM-UBM)). That is, for example, ANN_i is trained to discriminate between audio material from the $i^{th}$ enrolled speaker and the "average" speech material. In the event that a new enrolled speaker is to be added to the system, an additional ANN is trained (e.g., ANN_(K+1)) with the available audio material (audio features) from that particular speaker and audio features produced from the GMM-UBM system.

Accordingly, in one aspect there is provided a method for producing a set of trained artificial neural networks (ANNs) for use in determining the identity of an unknown speaker. In some embodiments the method includes obtaining a feature vector (x1) created using an utterance (i.e., at least one utterance) made by a first speaker (e.g., in a typical system x1 is created using several utterances made by the first speaker). The method also includes obtaining a feature vector (x_UBM) generated using a universal background model (UBM). Then, a first two-class ANN is trained using as inputs x1 and x_UBM to produce a first trained ANN. This first trained ANN is associated with the first speaker. Additionally, the method includes obtaining a feature vector (x2) created using an utterance made by a second speaker. Then, a second two-class ANN is trained using as inputs x2 and x_UBM to produce a second trained ANN that is associated with the second speaker. Additional ANNs can be likewise trained for additional enrolled speakers. It is also possible that some ANNs can be trained using a different UBM. That it, it is not a requirement that the same UBM be used for all ANNs.

Once the K ANNs have been trained, the system can be used to determine whether an unknown speaker is one of the K enrolled speakers. For example, an utterance from the unknown speaker is tested against all K ANNs, and the enrolled speaker with largest posterior probability is selected.

Accordingly, in one aspect there is provided a method for determining the identity of an unknown speaker. The method may begin with obtaining a feature vector (xU), wherein xU was created using an utterance made by the unknown speaker. Next, xU is inputted into a first artificial neural network (ANN_1) specifically associated with a first person, wherein: i) ANN_1 is configured such that, in response to xU being input into ANN_1, ANN_1 produces a first posterior probability (PP1), and ii) the ANN_1 was trained using only a feature vector (x1) created using an utterance made by the first person and a feature vector (x_UBM1) generated using a first universal background model (UBM1). Additionally, xU is input into a second ANN (ANN_2) specifically associated with a second person, wherein: i) ANN_2 is configured such that, in response to xU being input into ANN_2, ANN_2 produces a second posterior probability (PP2), and ii) ANN_2 was trained using only a feature vector (x2) created using an utterance made by the second person and either x_UBM1 or a feature vector (x_UBM2) generated using a second UBM (UBM2). Next, PP1 and PP2 are obtained, respectively, and PP1 and PP2 are compared to each other to determine whether PP1 is larger than PP2. In some embodiments, the method further includes comparing PP1 to a predetermined threshold value as a result of determining that PP1 is larger than PP2; and, as a result of determining that PP1 is larger than the predetermined threshold value, identifying the unknown speaker as the first person.

In another aspect there is provided a method for speaker verification in which an unknown speaker claims to be a certain person. The method may begin with obtaining a feature vector (xU), wherein xU was created using an utterance made by the unknown speaker who claims to be the certain person. An ANN specifically associated with the certain person is selected from a set of ANNs, wherein the selected ANN specifically associated with the certain person was trained using only a feature vector created using an utterance made by the certain person and a feature vector (x_UBM) generated using a universal background model (UBM). Next, xU is inputted into the selected ANN, wherein the ANN is configured such that in response to xU being input the ANN produces a posterior probability. Next, the posterior probability produced by the ANN as a result of inputting xU into the ANN is obtained. The obtained posterior probability is compared to a predetermined threshold value. Based on the comparison of the posterior probability to the predetermined threshold value a determination is made as to whether the unknown speaker is the certain person.

The improved K 2-class ANN architecture has the following advantages over the conventional ANN based speaker verification systems (i.e., the system in which a K-class ANN is trained on K classes): (1) the improved system can be extended easily with new enrolled speaker without requiring a complete retraining of a large ANN—this removes storage requirements and provides solution for cases when the audio material cannot be stored for legal reasons; (2) in case of verification of a predetermined enrolled speaker, only one small 2-class ANN need be used instead of a large K-class ANN—this greatly reduces verification time; and (3) training K 2-class ANNs could be parallelized easily, which brings significant reduction of training time over one large K-class ANN.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments.

DETAILED DESCRIPTION

Figure 1:
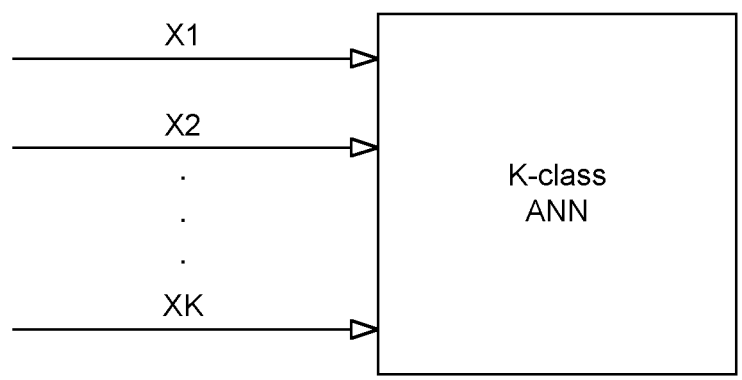
FIG. 1 illustrates the training of a conventional ANN based speaker verification system according to some embodiments.
Figure 2:
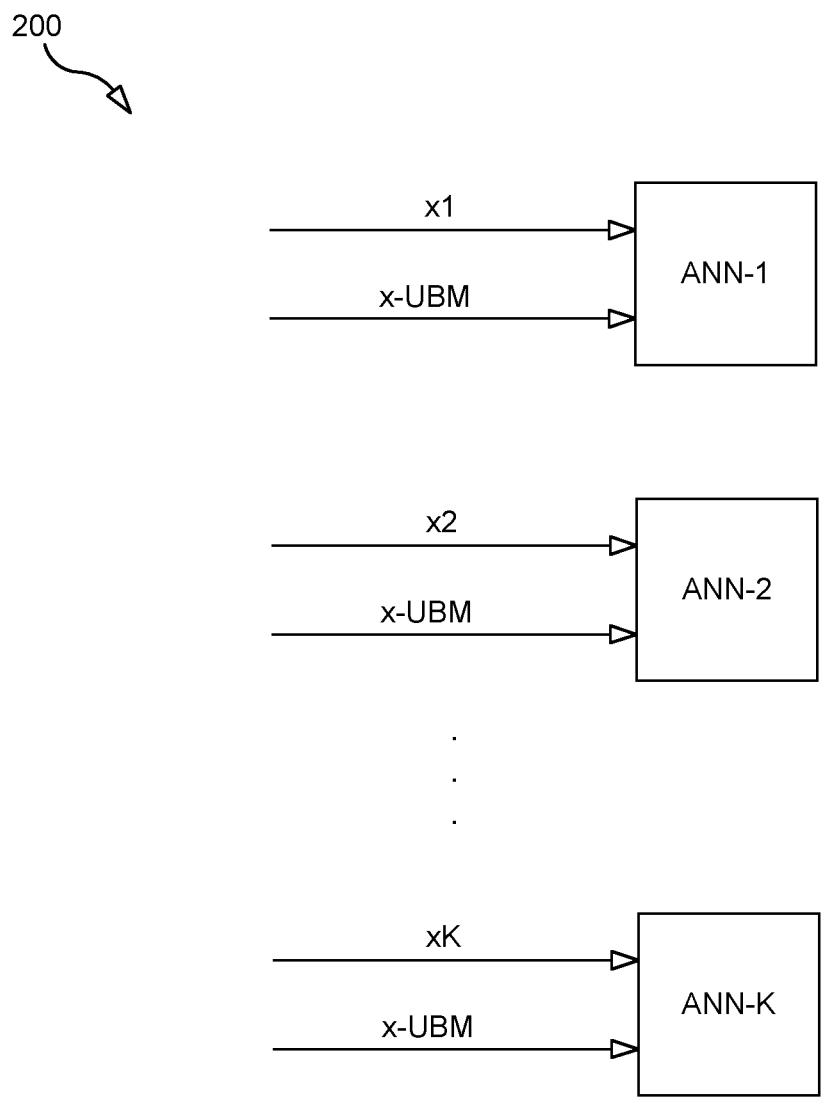
FIG. 2 illustrates the training of an ANN based speaker verification system according to some embodiments.

FIG. 2 illustrates a speaker verification system 200, according to some embodiments, in which there currently exists K enrolled speaker. As shown in FIG. 2, the example speaker verification system 200 includes K 2-class ANNs—i.e., one for each of the K enrolled speakers. More specifically, FIG. 2 illustrates the training stage for speaker verification system 200.

As shown in FIG. 2, each of the K 2-class ANNs is trained to discriminate between audio material from its corresponding enrolled speaker and "average" speech material (e.g., a feature vector generated using a Gaussian Mixture Model trained Universal Background Model (GMM-UBM)). More specifically, as shown in FIG. 2, each ANN receives a first feature vector generated using an utterance (e.g., using one or more utterances) from the corresponding enrolled speaker and a second feature vector, which is denoted x_UBM and which is a feature vector generated based on a GMM-UBM. x_UBM represents an average speaker (i.e., x_UBM captures underlying sound classes in speech, averaged over large number of speakers). More precisely, ANN_1 receives feature vectors x1 and x_UBM, ANN_2 receives feature vectors x2 and x_UBM, . . . , and ANN_K receives feature vectors xK and x_UBM, wherein x1 is a feature vector generated based on an utterance from the first enrolled speaker, x2 is a feature vector generated based on an utterance from the second enrolled speaker, and xK is a feature vector generated based on an utterance from the $K^{th}$ enrolled speaker.

Figure 3:
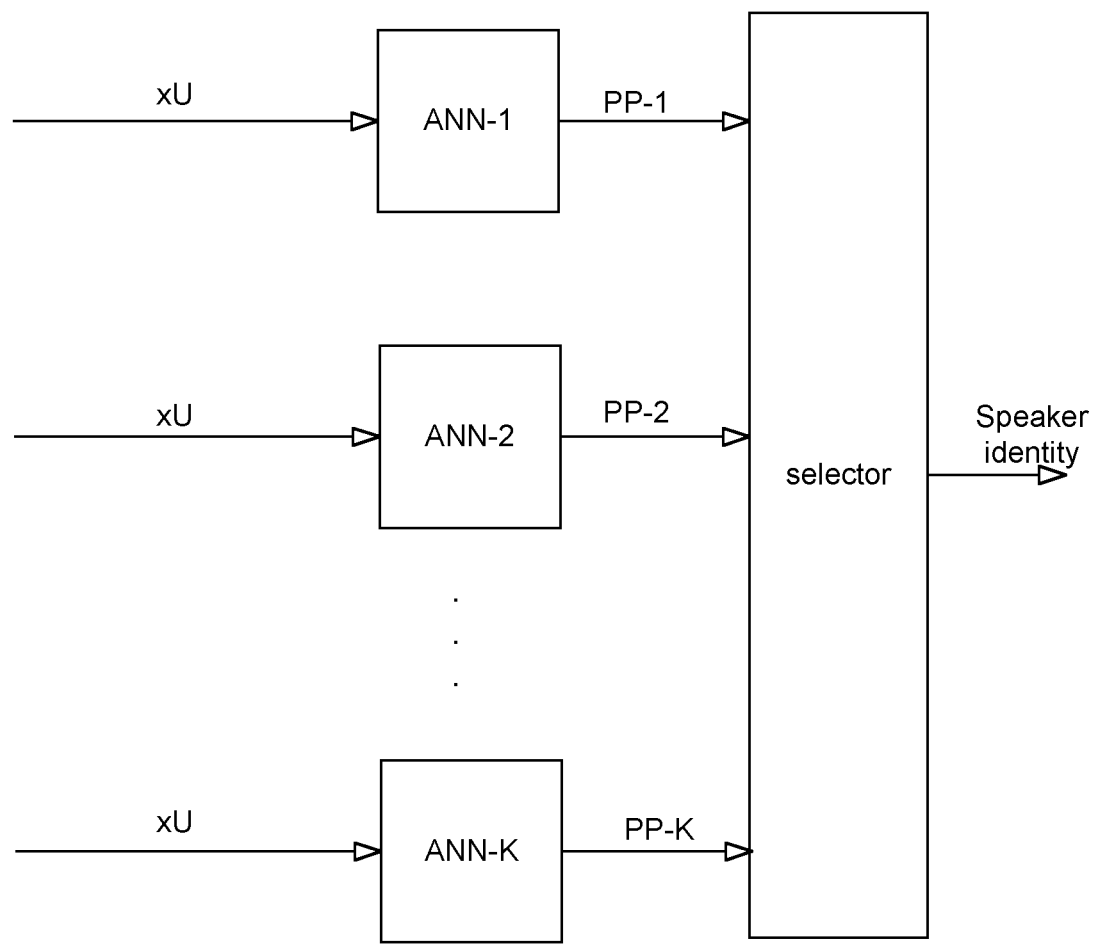
FIG. 3 illustrates an ANN based speaker verification system according to some embodiments.

FIG. 3 illustrates a speaker verification process for system 200 in some embodiments. In the embodiment shown in FIG. 3, a feature vector xU, which was generated based on an utterance from an unknown speaker, is input into each of the K ANNs. Each of the K ANNs then uses xU to produce a posterior probability (PP) indicating the probability that the unknown speaker is the enrolled speaker associated with the ANN, such that in total K PPs are produced (i.e., PP_1, PP_2, . . . , PP_K) by system 200. These K PPs are then obtained by a selector. The selector then determines which one of the ANNs produced the maximum PP and whether this maximum PP meets or exceeds a threshold (T). If the maximum PP meets or exceeds the threshold, then the selector will output information indicating the determined identity of the unknown speaker (e.g., the name of the enrolled speaker corresponding to the ANN that produced the maximum PP).

In situations where the unknown speaker claims to be a certain one of the enrolled speakers (e.g., the $i^{th}$ enrolled speaker), then it is not necessary to input xU into each of the K ANNs. Rather, it is only necessary to input xU into the ANN corresponding to the enrolled speaker who the unknown speaker claims to be and then determine whether the PP produced by this ANN meets or exceeds the threshold.

With system 200 it is rather easy to expand the number of enrolled speakers from K enrolled speakers to K+N enrolled speakers. To do so, N new ANNs are discriminative trained in the same manner in which the original K ANNs were discriminative trained. Once the new N ANNs are trained, the identity of an unknown speaker can be determined by inputting xU into each one of the K+N ANNs and then determining whether the maximum PP produced exceeds the threshold and the ANN that produced the maximum PP.

Figure 4:
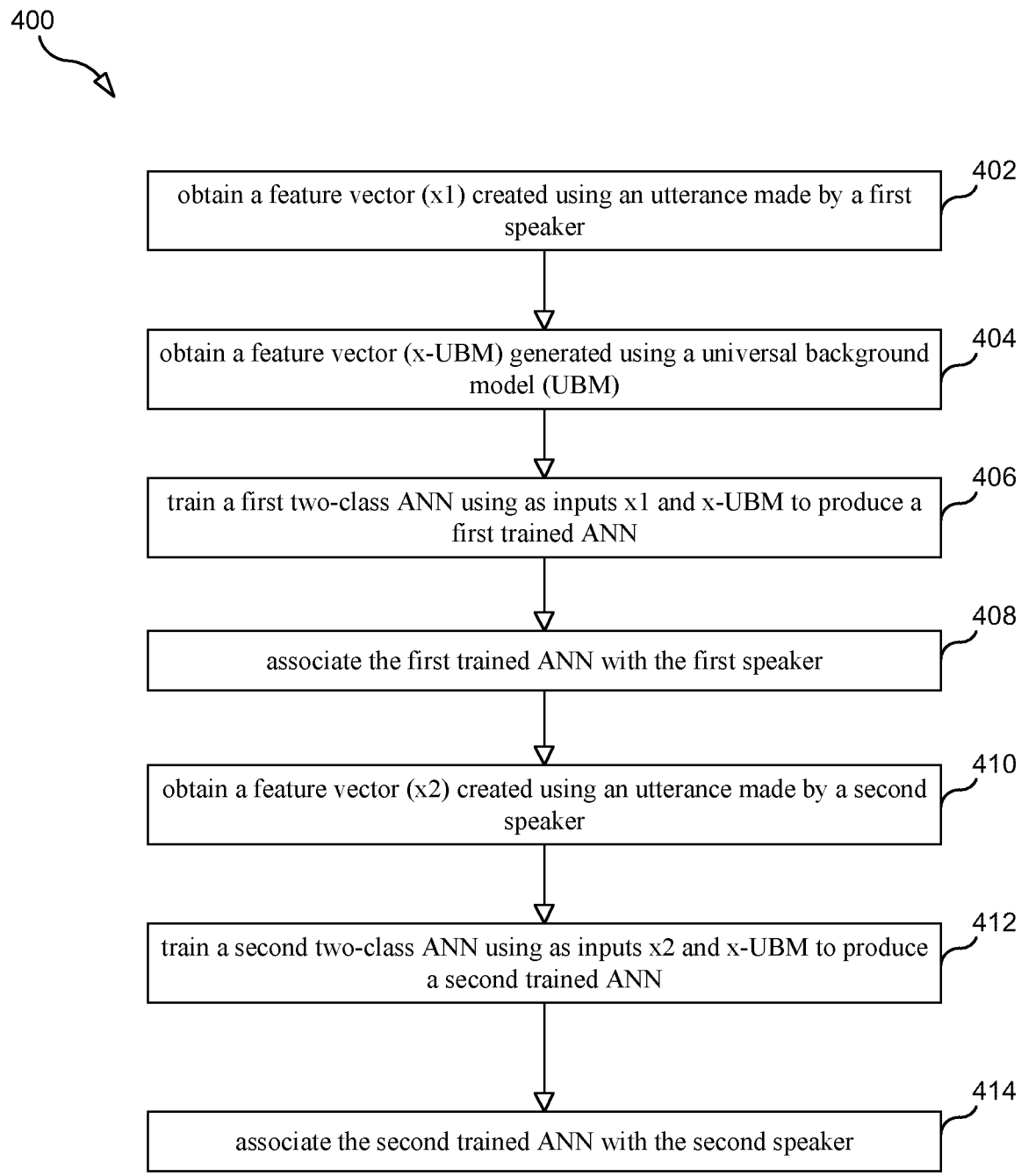
FIG. 4 is a flowchart illustrating a process according to some embodiments.

FIG. 4 is a flow chart illustrating a process 400, according to some embodiments, for producing a set of artificial neural networks (ANNs) for use in determining the identity of an unknown speaker.

Process 400 may begin with step 402, in which a feature vector (x1) created using an utterance made by a first speaker is obtained. For example, x1 may be created from one or more utterances made by the first speaker. In step 404, a feature vector generated using a universal background model (UBM) is obtained. This feature vector is denoted x_UBM. In step 406 a first two-class ANN is trained using as inputs x1 and x_UBM to produce a first trained ANN. In step 408 the first trained ANN is associated with the first speaker. In step 410 a feature vector (x2) created using an utterance made by a second speaker is obtained. In step 412 a second two-class ANN is trained using as inputs x2 and x_UBM to produce a second trained ANN. In step 414 the second trained ANN is associated with the second speaker. Additional ANNs can be likewise trained for additional enrolled speakers. It is also possible that some ANNs can be trained using a different UBM (e.g., x_UBM2 instead of x_UBM). That is, it is not a requirement that the same UBM be used for all ANNs. For example, in some scenarios two UBMs may be used: one for female speakers and one for male speakers. Thus, if a certain enrolled speaker is a male, then the ANN for this male enrolled speaker can be trained using a feature vector created from an utterance made by the enrolled speaker and a feature vector generated using a UBM for male speakers. Likewise, if a certain enrolled speaker is female, then the ANN for this female enrolled speaker can be trained using a feature vector created from an utterance made by the enrolled speaker and a feature vector generated using a different UBM for female speakers.

Figure 5:
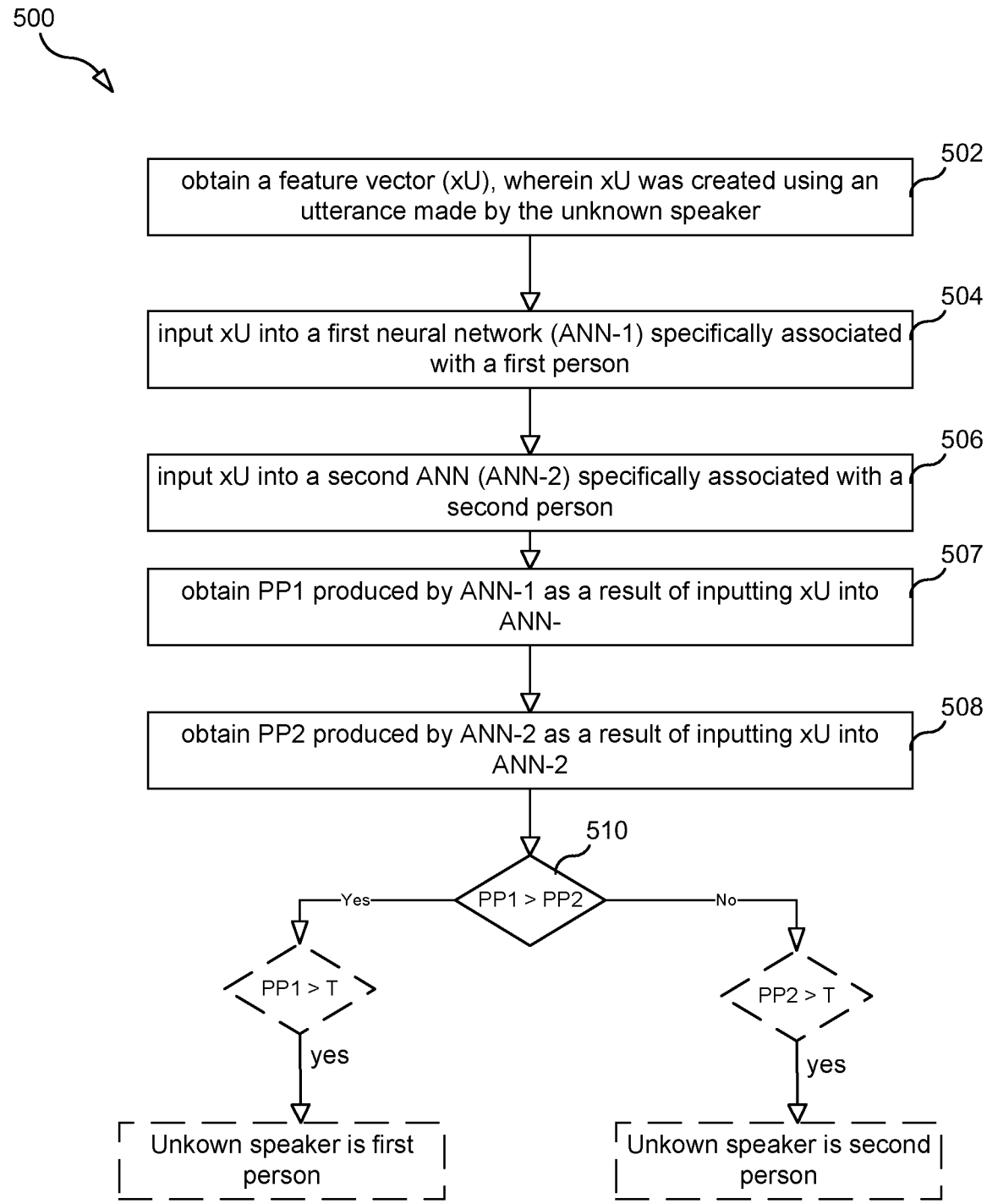
FIG. 5 is a flowchart illustrating a process according to some embodiments.

FIG. 5 is a flow chart illustrating a process 500, according to some embodiments, for determining the identity of an unknown speaker. Process 500 may begin with step 502, in which a feature vector (xU) is obtained, wherein xU was created using an utterance made by the unknown speaker. In step 504, xU is inputted into a first ANN (ANN_1) specifically associated with a first person, wherein: i) the ANN_1 is configured such that, in response to xU being input into ANN_1, ANN_1 produces a first posterior probability (PP1), and ii) the ANN_1 was trained using only a feature vector (x1) created using an utterance made by the first person and a feature vector (x_UBM1) generated using a first universal background model (UBM1). In step 506, xU is input into a second ANN (ANN_2) specifically associated with a second person, wherein: i) ANN_2 is configured such that, in response to xU being input into ANN_2, ANN_2 produces a second posterior probability (PP2), and ii) ANN_2 was trained using only a feature vector (x2) created using an utterance made by the second person and either x_UBM1 or a feature vector (x_UBM2) generated using a second UBM (UBM2). In steps 507 and 508, PP1 and PP2 are obtained, respectively. In step 510, PP1 and PP2 are compared to each other to determine whether PP1 is larger than PP2. In some embodiments, the method further includes comparing PP1 to a predetermined threshold value as a result of determining that PP1 is larger than PP2; and, as a result of determining that PP1 is larger than the predetermined threshold value, identifying the unknown speaker as the first person.

Figure 6:
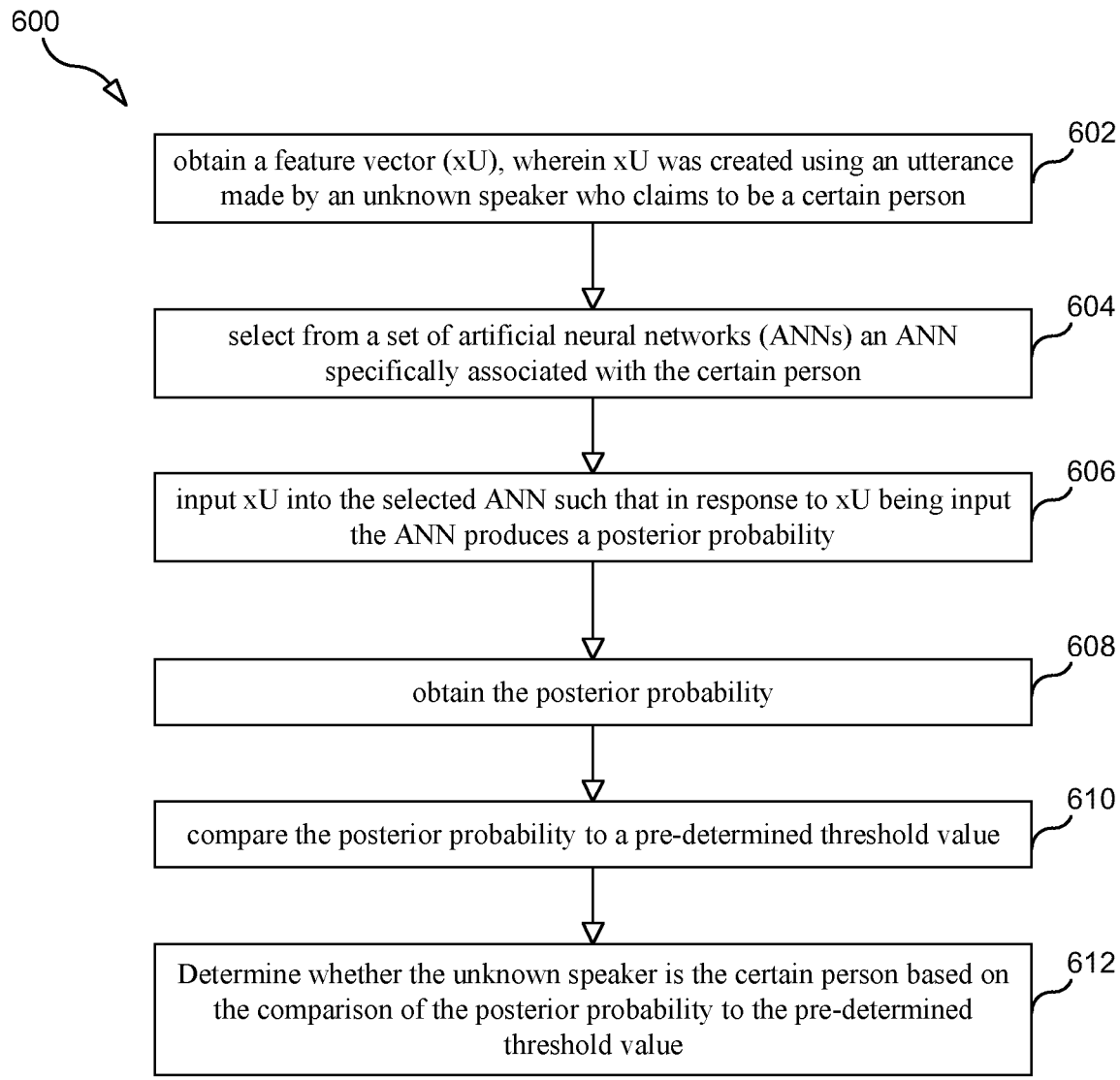
FIG. 6 is a flowchart illustrating a process according to some embodiments.

FIG. 6 is a flow chart illustrating a process 600, according to some embodiments, for speaker verification. Process 600 may begin with step 602, in which a feature vector (xU) is obtained, wherein xU was created using an utterance made by an unknown speaker who claims to be a certain person. In step 604, an ANN specifically associated with the certain person is selected from a set of ANNs, wherein the selected ANN specifically associated with the certain person was trained using only a feature vector created using an utterance made by the certain person and a feature vector (x_UBM) generated using a universal background model (UBM). In step 606, xU is inputted into the selected ANN, wherein the ANN is configured such that in response to xU being input the ANN produces a posterior probability. In step 608, the posterior probability produced by the ANN as a result of inputting xU into the ANN is obtained. In step 610, the posterior probability is compared to a predetermined threshold value. In step 612, based on the comparison of the posterior probability to the predetermined threshold value a determination is made as to whether the unknown speaker is the certain person.

Figure 7:
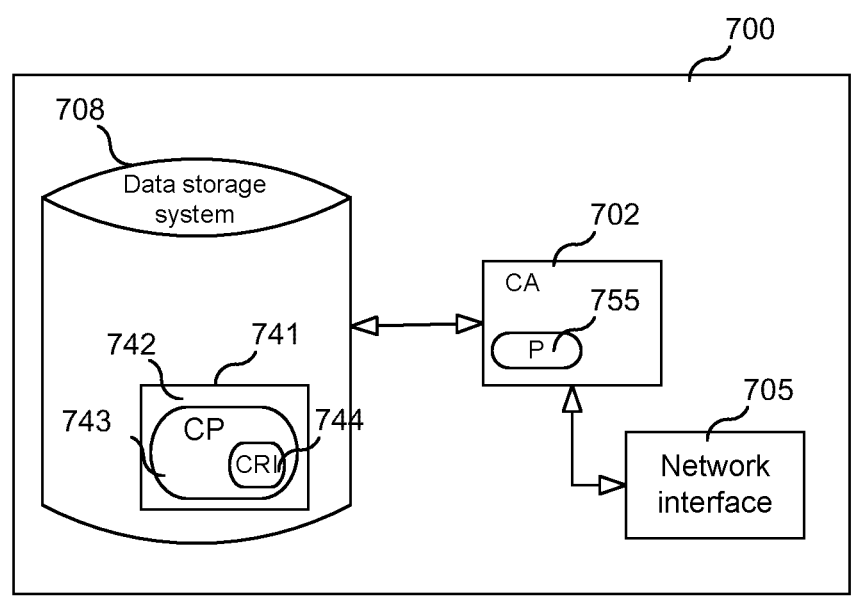
FIG. 7 is a block diagram of a computer system according to some embodiments.

FIG. 7 is a block diagram of a computer system 700 that can be configured to perform the processes described above. As described below, computer system 700 may consist of a single computer apparatus 702 or set of computer apparatuses (i.e., computer system 700 may be a cloud computing system).

As shown in FIG. 7, computer system 700 includes at least one computer apparatus (CA) 702, which may include one or more processors 755 (e.g., one or more general purpose microprocessors and/or one or more data processing circuits, such as an application specific integrated circuit (ASIC), field-programmable gate arrays (FPGAs), logic circuits, and the like). In some embodiments, computer system 700 includes a plurality of CAs 702, which may or may not be co-located. Thus, computer system 700 may be implemented in a cloud computing environment. Computer system 700 includes a data storage system 708, which may include one or more non-volatile storage devices and/or one or more volatile storage devices (e.g., random access memory (RAM)). Computer system 700 may further include a network interface 705 for use in transmitting and receiving data via a communications link.

In embodiments where computer apparatus 702 includes a microprocessor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, but not limited, to magnetic media (e.g., a hard disk), optical media (e.g., a DVD), memory devices (e.g., random access memory), and the like, but not a signal. In some embodiments, the CRI of computer program 743 is configured such that when executed by computer apparatus 702, the CRI causes the computer apparatus 702 to perform steps described above. In other embodiments, computer apparatus 702 may be configured to perform steps described herein without the need for code. That is, for example, computer apparatus 702 may consist merely of one or more ASICs. Hence, the features of the embodiments described herein may be implemented in hardware and/or software.

Figure 8:
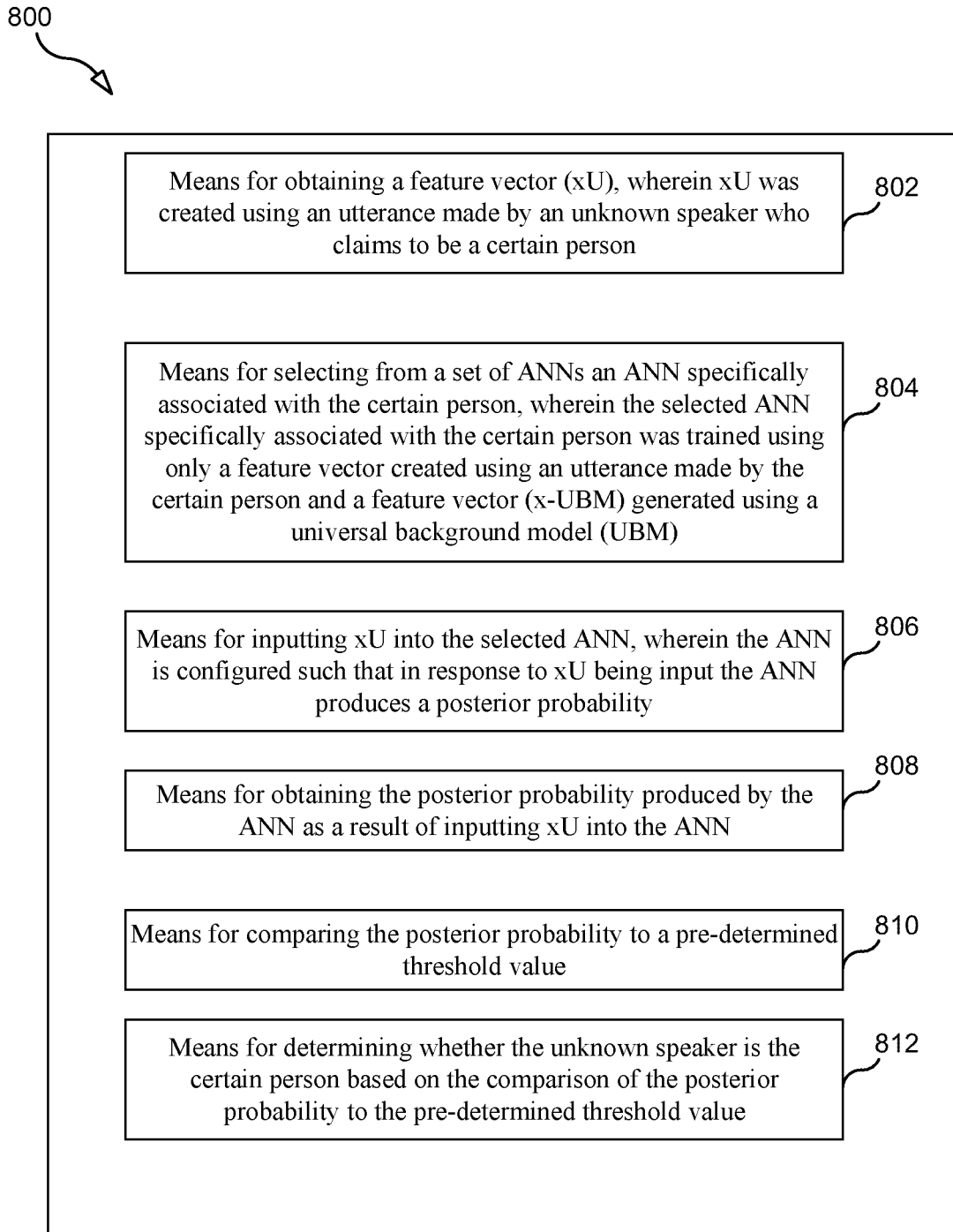
FIG. 8 illustrates an apparatus 800 for speaker verification according to some embodiments.

FIG. 8 illustrates an apparatus 800 for speaker verification according to some embodiments. Apparatus 800 includes means for obtaining 802 a feature vector, xU, wherein xU was created using an utterance made by an unknown speaker who claims to be a certain person; means for selecting 804 from a set of artificial neural networks, ANNs, an ANN specifically associated with the certain person, wherein the selected ANN specifically associated with the certain person was trained using only a feature vector created using an utterance made by the certain person and a feature vector, x_UBM, generated using a universal background model, UBM; means for inputting 806 xU into the selected ANN, wherein the ANN is configured such that in response to xU being input the ANN produces a posterior probability; means for obtaining 808 the posterior probability produced by the ANN as a result of inputting xU into the ANN; means for comparing 810 the posterior probability to a predetermined threshold value; and means for determining 812 whether the unknown speaker is the certain person based on the comparison of the posterior probability to the predetermined threshold value.

Figure 9:
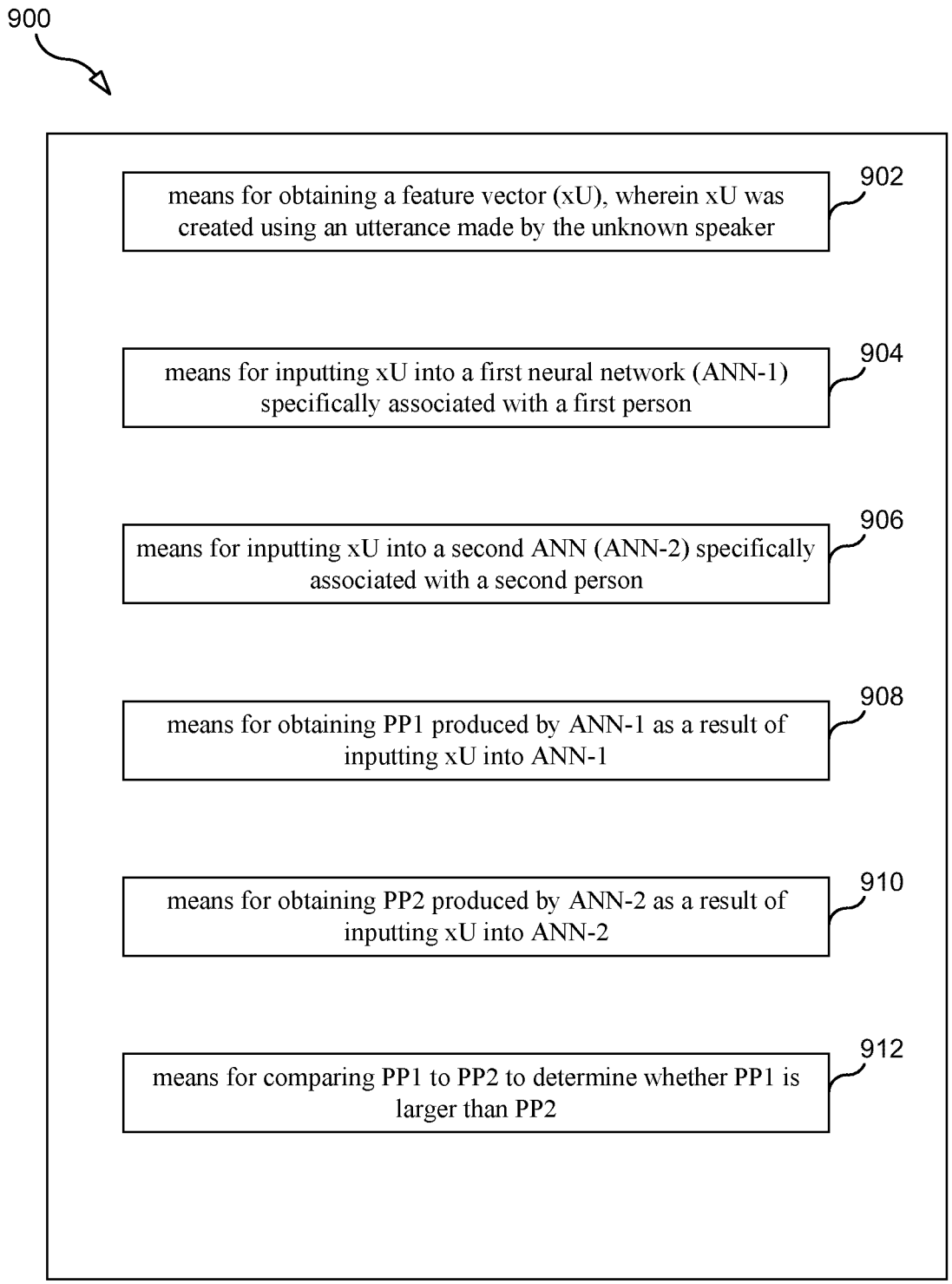
FIG. 9 illustrates an apparatus 900 for determining the identity of an unknown speaker according to some embodiments.

FIG. 9 illustrates an apparatus 900 for determining the identity of an unknown speaker according to some embodiments. Apparatus 900 includes: means for obtaining 902 a feature vector, xU, wherein xU was created using an utterance made by the unknown speaker; means for inputting 904 xU into a first artificial neural network, ANN_1, specifically associated with a first person, wherein: i) the ANN_1 is configured such that, in response to xU being input into ANN_1, ANN_1 produces a first posterior probability, PP1, and ii) the ANN_1 was trained using only a feature vector, x1, created using an utterance made by the first person and a feature vector, x_UBM1, generated using a first universal background model, UBM1; means for inputting 906 xU into a second artificial neural network, ANN_2, specifically associated with a second person, wherein: i) ANN_2 is configured such that, in response to xU being input into ANN_2, ANN_2 produces a second posterior probability, PP2, and ii) ANN_2 was trained using only a feature vector, x2, created using an utterance made by the second person and either x_UBM1 or a feature vector, x_UBM2, generated using a second UBM, UBM2; means for obtaining 908 PP1 produced by ANN_1 as a result of inputting xU into ANN_1; means for obtaining 910 PP2 produced by ANN_2 as a result of inputting xU into ANN_2; and means for comparing 912 PP1 to PP2 to determine whether PP1 is larger than PP2.

Figure 10:
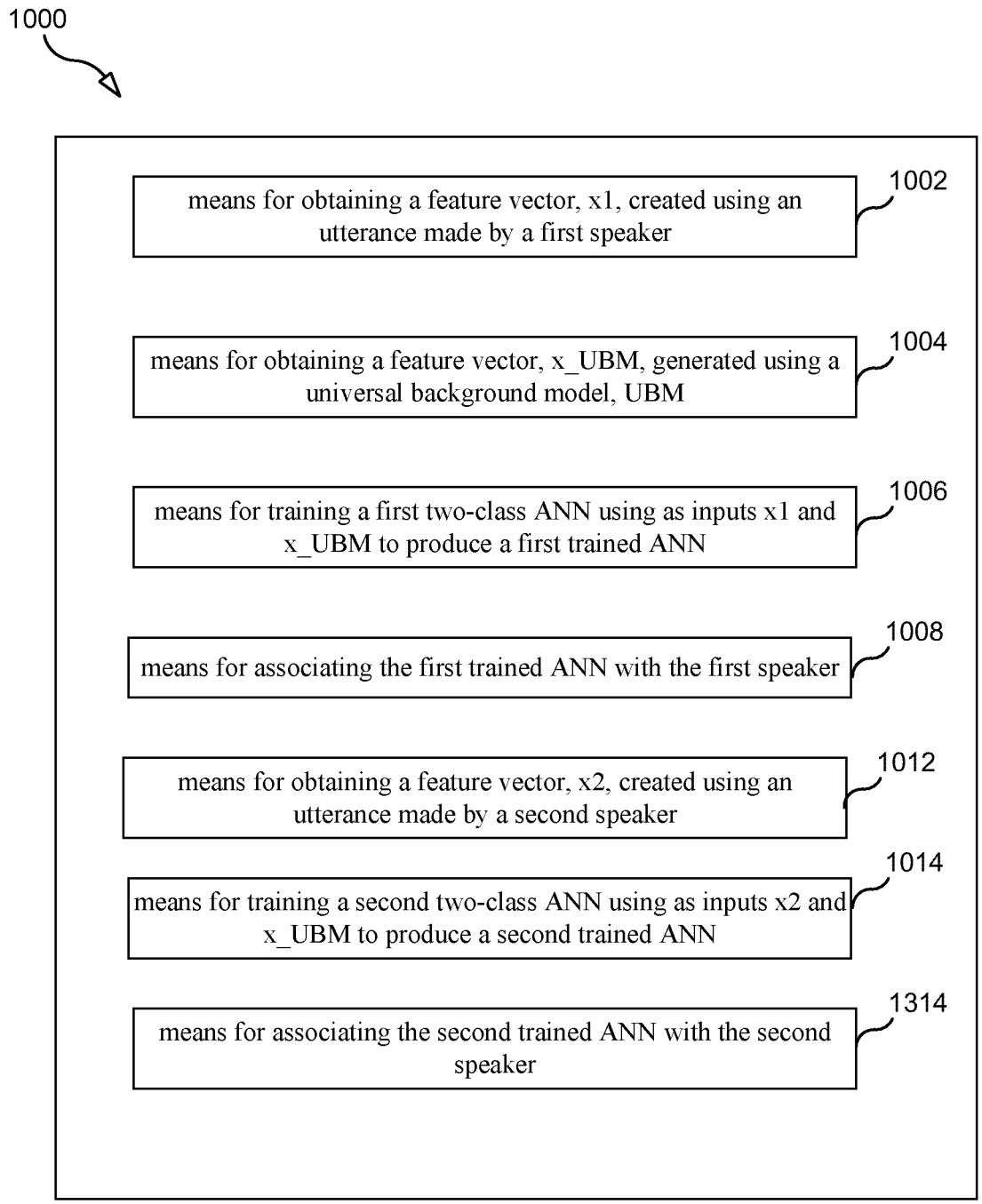
FIG. 10 illustrates an apparatus 1000 for producing a set of trained artificial neural networks, ANNs, for use in determining the identity of an unknown speaker according to some embodiments.

FIG. 10 illustrates an apparatus 1000 for producing a set of trained artificial neural networks, ANNs, for use in determining the identity of an unknown speaker according to some embodiments. Apparatus 1000 includes: means for obtaining 1002 a feature vector, x1, created using an utterance made by a first speaker; means for obtaining 1004 a feature vector, x_UBM, generated using a universal background model, UBM; means for training 1006 a first two-class ANN using as inputs x1 and x_UBM to produce a first trained ANN; means for associating 1008 the first trained ANN with the first speaker; means for obtaining 1010 a feature vector, x2, created using an utterance made by a second speaker; means for training 1012 a second two-class ANN using as inputs x2 and x_UBM to produce a second trained ANN; and means for associating 1014 the second trained ANN with the second speaker.

While various embodiments of the present disclosure are described herein, it should be understood that they have been presented by way of example only, and not limitation. Thus, the breadth and scope of the present disclosure should not be limited by any of the above described exemplary embodiments. Moreover, any combination of the above described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be rearranged, and some steps may be performed in parallel.

The invention claimed is:

1. A computer apparatus, comprising:
processing circuitry; and
a memory storing instructions that, when executed by the processing circuitry, cause the computer apparatus to:
obtain a feature vector (xU), wherein xU was created using an utterance made by an unknown speaker who claims to be a certain person;
select from a set of artificial neural networks (ANNs), an ANN specifically associated with the certain person, wherein the selected ANN specifically associated with the certain person was trained using a feature vector created using an utterance made by the certain person and a feature vector (x_UBM) generated using a universal background model (UBM);
input xU into the selected ANN, wherein the ANN is configured such that in response to xU being input, the ANN produces a posterior probability;
obtain the posterior probability produced by the ANN as a result of inputting xU into the ANN;
compare the posterior probability to a predetermined threshold value; and
determine whether the unknown speaker is the certain person based on the comparison of the posterior probability to the predetermined threshold value.

2. The computer apparatus of claim 1, wherein the selected ANN is a two-class ANN.

3. The computer apparatus of claim 1, wherein the UBM is a speaker-independent Gaussian Mixture Model (GMM), trained with speak samples from a plurality of speakers.

4. A computer apparatus configured for determining the identity of an unknown speaker, comprising:
processing circuitry; and
a memory storing instructions that, when executed by the processing circuitry, cause the computer apparatus to:
obtain a feature vector (xU), wherein xU was created using an utterance made by the unknown speaker;
input xU into a first artificial neural network (ANN_1) specifically associated with a first person, wherein: i) the ANN_1 is configured such that, in response to xU being input into ANN_1, ANN_1 produces a first posterior probability (PP1), and ii) the ANN_1 was trained using a feature vector (x1) created using an utterance made by the first person and a feature vector (x_UBM1) generated using a first universal background model, UBM1;
input xU into a second artificial neural network (ANN_2) specifically associated with a second person, wherein: i) ANN_2 is configured such that, in response to xU being input into ANN_2, ANN_2 produces a second posterior probability, PP2, and ii) ANN_2 was trained using a feature vector (x2) created using an utterance made by the second person and either x_UBM1 or a feature vector (x_UBM2) generated using a second UBM (UBM2);
obtain PP1 produced by ANN_1 as a result of inputting xU into ANN_1;
obtain PP2 produced by ANN_2 as a result of inputting xU into ANN_2; and
compare PP1 to PP2 to determine whether PP1 is larger than PP2.

5. The computer apparatus of claim 4, wherein the instructions cause the computer apparatus to:
as a result of determining that PP1 is larger than PP2, compare PP1 to a predetermined threshold value; and
as a result of determining that PP1 is larger than the predetermined threshold value, identify the unknown speaker as the first person.

6. A computer apparatus configured for determining the identity of an unknown speaker, comprising:
processing circuitry; and
a memory storing instructions that, when executed by the processing circuitry, cause the computer apparatus to:
obtain a feature vector (x1) created using an utterance made by a first speaker;

obtain a feature vector (x_UBM) generated using a universal background model (UBM);
train a first two-class artificial neural network (ANN) using as inputs x1 and x_UBM to produce a first trained ANN;
associate the first trained ANN with the first speaker;
obtain a feature vector (x2) created using an utterance made by a second speaker;
train a second two-class ANN using as inputs x2 and x_UBM to produce a second trained ANN; and
associate the second trained ANN with the second speaker.

* * * * *